( 12 ) United States Patent
Kurata et al.

(10) Patent No.: US 11,511,622 B2
(45) Date of Patent: Nov. 29, 2022

(54) MOUNTING STRUCTURE FOR FUEL SHUTOFF VALVE UNIT

(71) Applicant: HONDA MOTOR CO., LTD., Tokyo (JP)

(72) Inventors: Ko Kurata, Wako (JP); Hiroshi Inaoka, Wako (JP); Ikuo Hara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/297,003

(22) PCT Filed: Nov. 30, 2018

(86) PCT No.: PCT/JP2018/044295
§ 371 (c)(1),
(2) Date: May 26, 2021

(87) PCT Pub. No.: WO2020/110314
PCT Pub. Date: Jun. 4, 2020

(65) Prior Publication Data
US 2022/0024297 A1 Jan. 27, 2022

(51) Int. Cl.
B60K 15/035 (2006.01)
B60K 15/04 (2006.01)
(Continued)

(52) U.S. Cl.
CPC ...... *B60K 15/03519* (2013.01); *B60K 15/035* (2013.01); *B60K 15/04* (2013.01);
(Continued)

(58) Field of Classification Search
CPC ............ B60K 15/03519; B60K 15/035; B60K 15/04; B60K 2015/03289;
(Continued)

(56) References Cited

U.S. PATENT DOCUMENTS 5,277,217 A * 1/1994 Kobayashi ....... B60K 15/03519
137/39
6,499,500 B2 * 12/2002 Rosseel ............ B60K 15/03519
137/15.17
(Continued)

FOREIGN PATENT DOCUMENTS

CN 201884772 6/2011
CN 202272120 6/2012
(Continued)

OTHER PUBLICATIONS

International Search Report and Written Opinion for International Application No. PCT/JP2018/044295 dated Feb. 19, 2019, 7 pages.

Primary Examiner — Patrick C Williams
(74) Attorney, Agent, or Firm — Amin, Turocy & Watson, LLP

(57) ABSTRACT

A mounting structure for a fuel shutoff valve unit (U) includes a valve device (50) which is provided in a fuel tank (31) of a saddle type vehicle (1) and in which a breather passage (Y) which discharges volatile fuel to the outside is formed and a valve (51) which prevents leakage of liquid fuel is provided, wherein, in the saddle type vehicle including a filler tube (F) which is provided inside the fuel tank (31) and supplies fuel supplied from the outside to the inside of the fuel tank (31), a support member (B) which is provided on an outer peripheral surface of the filler tube (F) and supports the fuel shutoff valve unit (U) inside the fuel tank (31) is provided.

6 Claims, 8 Drawing Sheets

(51) Int. Cl.
*B62J 35/00* (2006.01)
*B60K 15/03* (2006.01)
*B62J 37/00* (2006.01)

(52) U.S. Cl.
CPC ..... *B62J 35/00* (2013.01); *B60K 2015/03289* (2013.01); *B60K 2015/0474* (2013.01); *B62J 37/00* (2013.01)

(58) Field of Classification Search
CPC ... B60K 2015/0474; B62J 35/00; B62J 37/00; B62K 11/04; B60Y 2200/12; F16K 27/00
See application file for complete search history.

(56) References Cited

U.S. PATENT DOCUMENTS

| | | | |
|---|---|---|---|
| 6,932,103 B2 * | 8/2005 | Iwamoto | B60K 15/03519 137/202 |
| 7,748,397 B2 * | 7/2010 | Firtion | B60K 15/03 403/375 |
| 8,042,523 B2 * | 10/2011 | Lee | B60K 15/03519 137/202 |
| 2005/0034759 A1 * | 2/2005 | McIntosh | B60K 15/03519 137/202 |

FOREIGN PATENT DOCUMENTS

| | | |
|---|---|---|
| JP | 09-123971 | 5/1997 |
| JP | 2008-138732 | 6/2008 |

\* cited by examiner

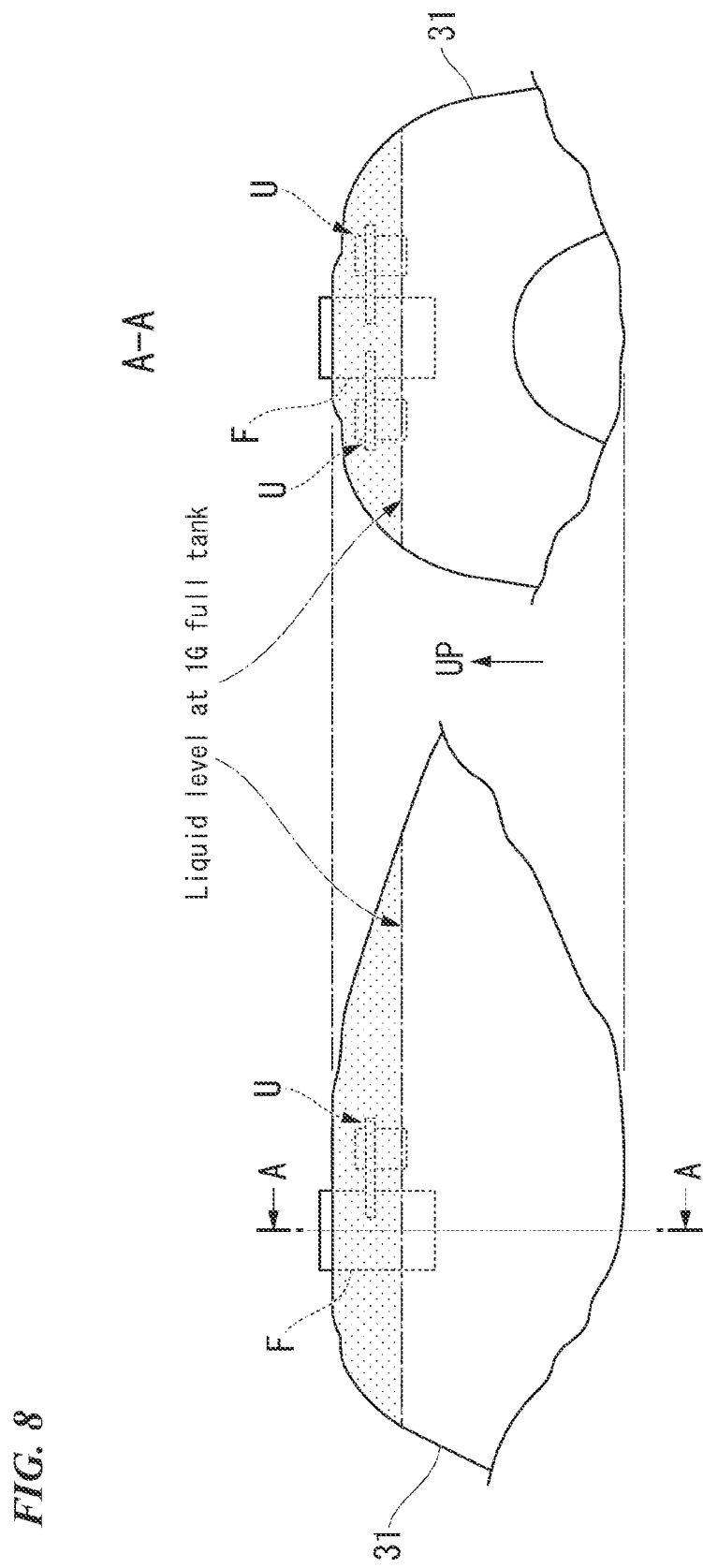

MOUNTING STRUCTURE FOR FUEL SHUTOFF VALVE UNIT

TECHNICAL FIELD

The present invention relates to a mounting structure for a fuel shutoff valve unit.

BACKGROUND ART

A valve device (a rollover valve) which prevents fuel leakage when a vehicle body is inclined at at least a predetermined angle or falls over while gasoline vapor filling a tank is let out may be provided in a fuel tank of a saddle type vehicle. In a process of mounting such a valve device in the fuel tank, being able to securely mount the valve device while improving workability is required.

Patent Literature 1 (Japanese Unexamined Patent Application, First Publication No. 2008-138732) discloses a technique for mounting a float valve inside a fuel tank.

According to the mounting method, a flange part of the float valve mounted inside the fuel tank is disposed and fastened between a holder and a cover member, and the float valve is fixed to the fuel tank.

SUMMARY OF INVENTION

Technical Problem

However, according to the technique described in Patent Literature 1, there is a problem in that a member for mounting a relief valve in the fuel tank is required and a structure thereof is complicated.

The present invention has been made in consideration of such circumstances, and one object of the present invention is to provide a mounting structure for a fuel shutoff valve unit which can be easily and reliably mounted in a fuel tank while a structure thereof is simplified.

Solution to Problem

As a means for solving the above problems, the mounting structure for a fuel shutoff valve of the present invention have the following configurations.

(1) A mounting structure for a fuel shutoff valve is a mounting structure for a fuel shutoff valve unit (U) including a valve device (50) which is provided in a fuel tank (31) of a saddle type vehicle and in which a breather passage (Y) which discharges volatile fuel to the outside is formed and a valve (51) which prevents leakage of liquid fuel is provided, wherein, in the saddle type vehicle including a filler tube (F) which is provided inside the fuel tank (31) and supplies fuel supplied from the outside to the inside of the fuel tank (31), a support member (B) which is provided on an outer peripheral surface of the filler tube (F) and supports the fuel shutoff valve unit (U) inside the fuel tank (31) is provided.

(2) In the mounting structure for a fuel shutoff valve according to the aspect (1), the support member (B) may include a pair of claw parts (B6 and B7) formed to sandwich and fix the fuel shutoff valve unit (U), and the fuel shutoff valve unit (U) may include a fitting part (115) which is fitted to the pair of claw parts (B6 and B7) and fixes the fuel shutoff valve unit (U) to the support member (B).

(3) In the mounting structure for a fuel shutoff valve according to the aspect (2), the fuel shutoff valve unit (U) may include a flange part (113) formed to protrude outward in a radial direction of the fuel shutoff valve unit (U) in a plan view, and the pair of claw parts (B6 and B7) may support a lower surface of the flange part (113).

(4) In the mounting structure for a fuel shutoff valve according to the aspect (3), a hook part (116) formed to protrude outward in the radial direction in a plan view may be provided on a part of a side surface of the flange part (113), and the support member (B) may include a locking part (B8) formed so that the hook part (116) is locked thereto in a state in which the fuel shutoff valve unit (U) is fitted.

(5) In the mounting structure for a fuel shutoff valve according to any one of aspects (1) to (4), the filler tube (F) may be disposed to protrude inward from an upper surface of the fuel tank (31).

(6) In the mounting structure for a fuel shutoff valve according to any one of aspects (1) to (5), in the fuel tank (31), the filler tube (F) may be disposed at substantially a center of the vehicle in a plan view, and the support member (B) may be disposed at substantially the center of the vehicle by being mounted in the filler tube (F).

(7) In the mounting structure for a fuel shutoff valve according to any one of aspects (1) to (6), the fuel shutoff valve unit (U) may be mounted above a liquid level of the fuel in the fuel tank (31) when the vehicle is stopped.

Advantageous Effects of Invention

According to the aspect (1), the number of members for assembling the fuel shutoff valve unit can be reduced, and the fuel shutoff valve unit can be disposed inside the fuel tank by disposing the support member in the filler tube inside the fuel tank. Moreover, since the fuel shutoff valve unit does not protrude from the fuel tank, aesthetic appearance is improved.

According to the aspect (2), since the fuel shutoff valve unit is locked by the claw parts formed on an indicator member, it can be easily assembled.

According to the aspect (3), since movement of the pair of claw parts in a vertical direction is restricted by the formation of the flange part, the fuel shutoff valve unit can be positioned in the vertical direction with a simple structure.

According to the aspect (4), the flange part positions the fuel shutoff valve unit in the vertical direction by means of the hook part being formed on the flange part, and the fuel shutoff valve unit can be positioned in a horizontal direction by locking the hook part to the locking part of the support member.

According to the aspect (5), the volatile fuel generated in the fuel tank can be effectively collected by mounting the fuel shutoff valve unit in the fuel tank.

According to the aspect (6), the volatile fuel generated in the fuel tank can be effectively collected by disposing the fuel shutoff valve unit at substantially the center of the vehicle.

According to the aspect (7), the volatile fuel generated in the fuel tank can be effectively collected by mounting the fuel shutoff valve unit above the liquid level of the fuel when the vehicle is stopped.

BRIEF DESCRIPTION OF DRAWINGS

FIG. 8 is a diagram showing another arrangement of the fuel shutoff valve unit in the fuel tank.

DESCRIPTION OF EMBODIMENTS

Figure 1:
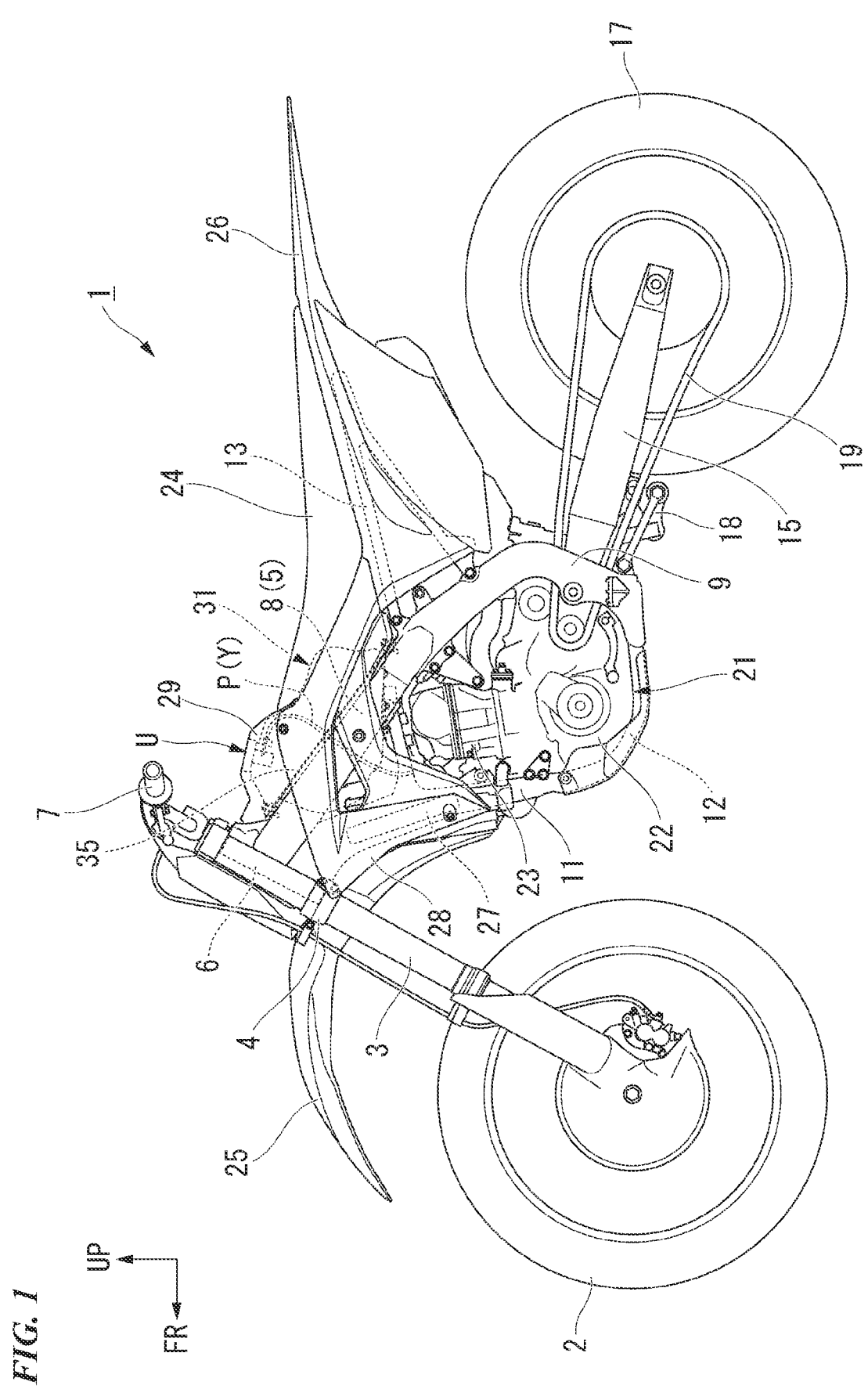
FIG. 1 is a left side view of a motorcycle according to an embodiment.

Hereinafter, embodiments of the present invention will be described with reference to the drawings. Unless otherwise specified, directions such as forward, rearward, left, and right in the following description are the same as directions in a vehicle described below. At appropriate places in the drawings used in the following description, an arrow FR indicating the front of the vehicle and an arrow UP indicating the upper side of the vehicle are shown.

<Whole Vehicle>

Figure 2:
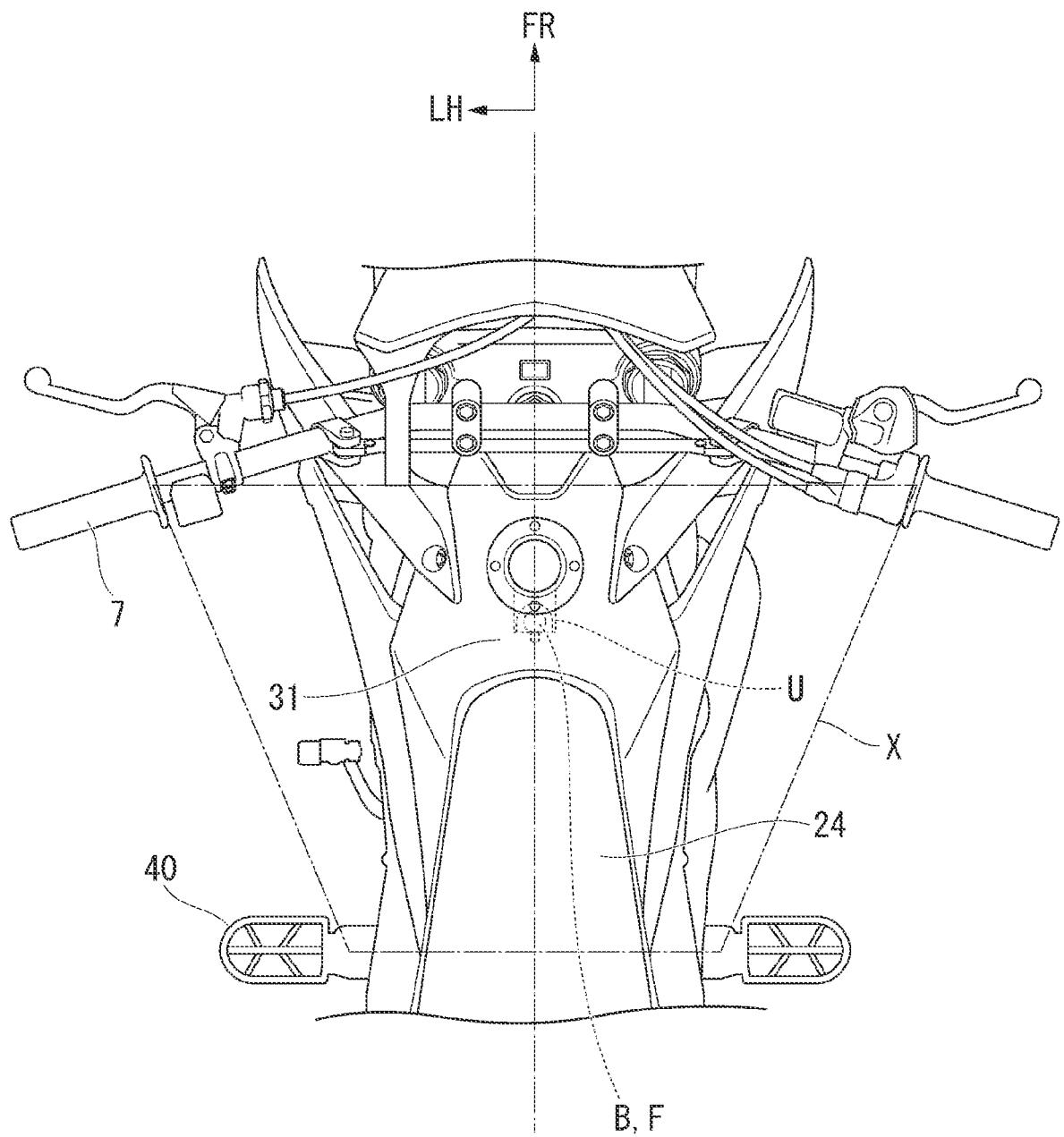
FIG. 2 is a plan view of the motorcycle.
Figure 3:
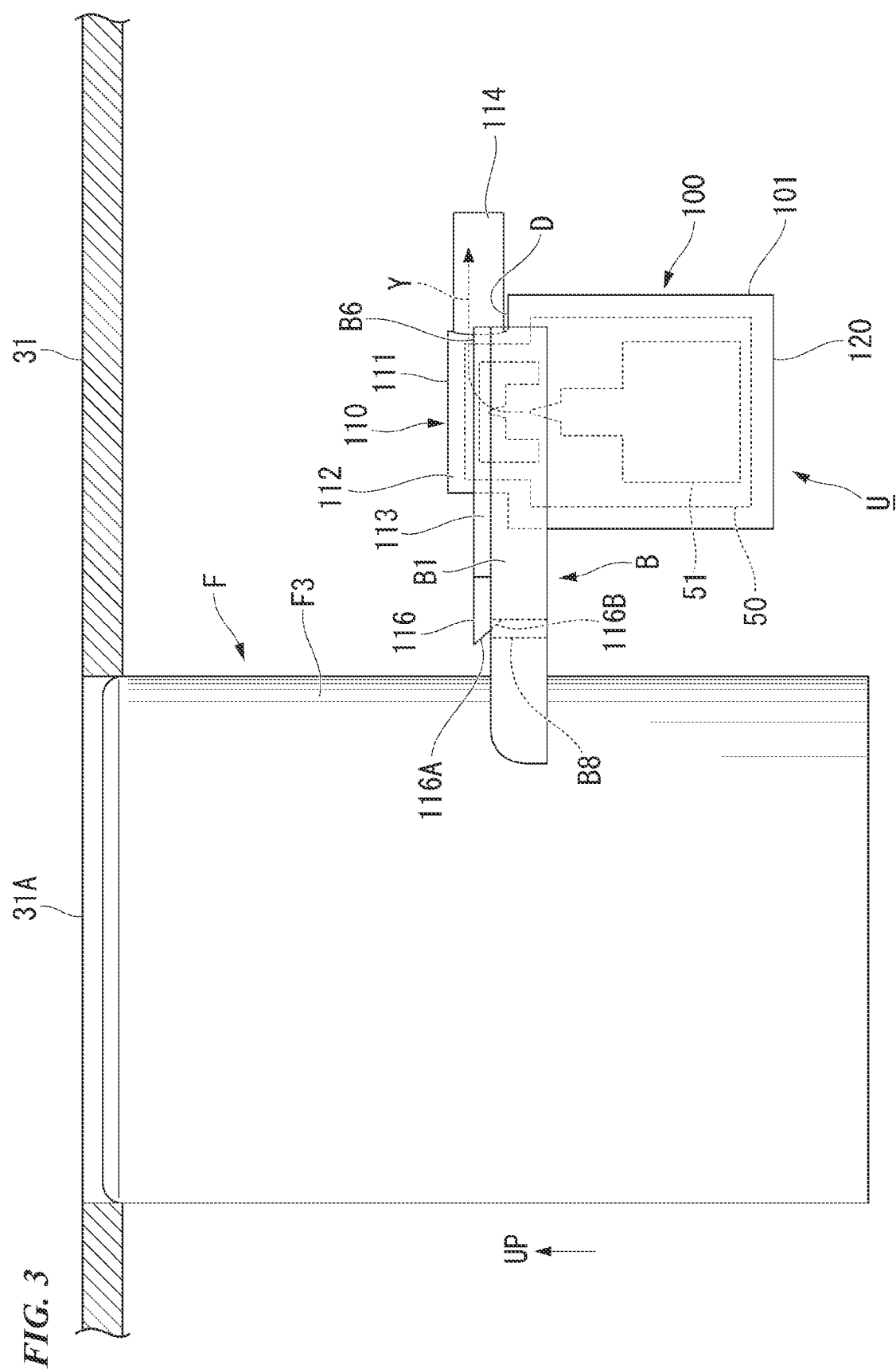
FIG. 3 is a side view showing a mounting structure for a fuel shutoff valve unit.
Figure 4:
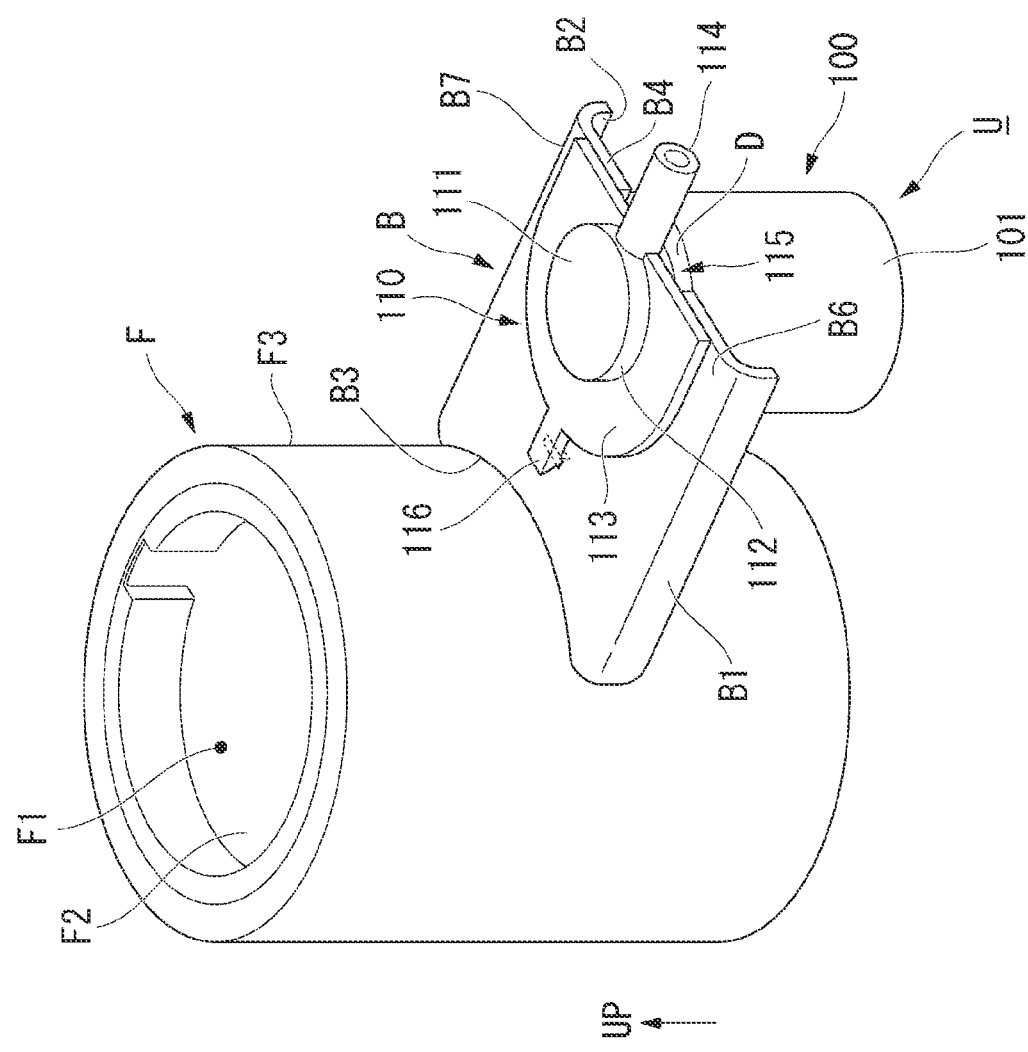
FIG. 4 is a perspective view of the fuel shutoff valve unit when seen in a direction of an upper surface.
Figure 5:
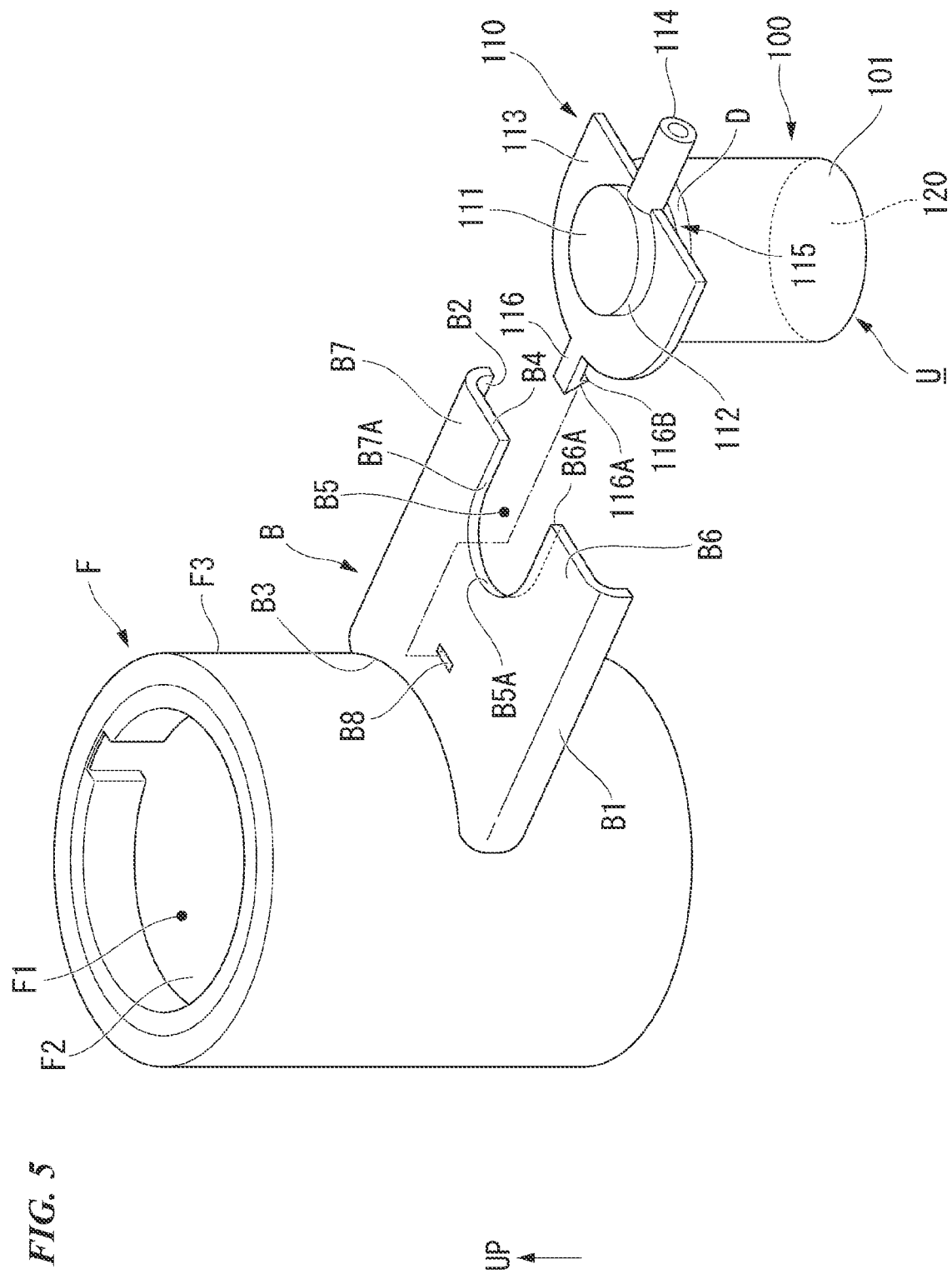
FIG. 5 is an exploded perspective view of the fuel shutoff valve unit when seen in the direction of the upper surface.
Figure 6:
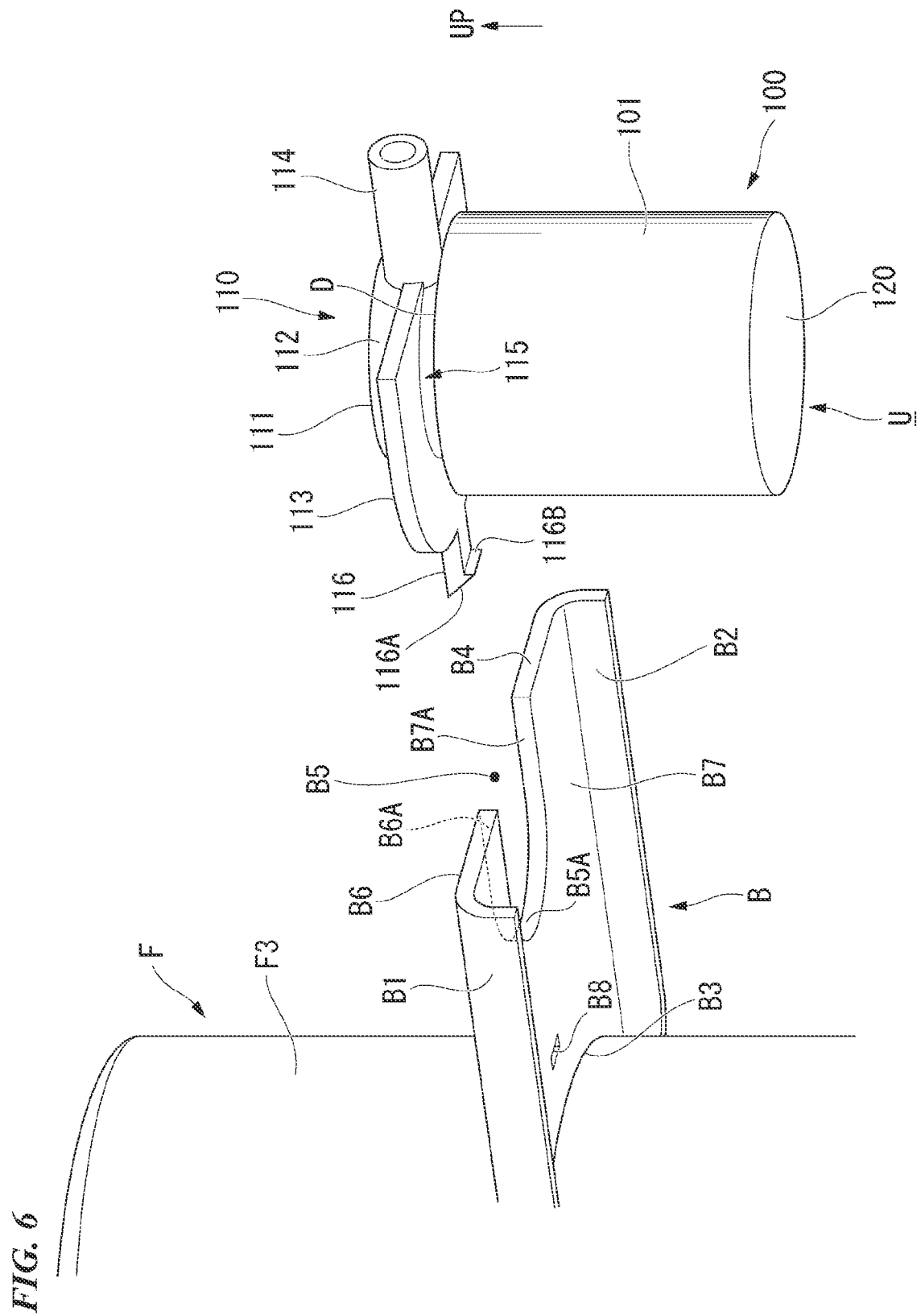
FIG. 6 is a perspective view of the fuel shutoff valve unit when seen in a direction of a lower surface.

FIGS. 1 and 2 show an off-road type motorcycle 1 as an example of a saddle type vehicle. A front wheel 2 of the motorcycle 1 is pivotally supported at lower end portions of left and right front forks 3. Upper portions of the left and right front forks 3 are steerably supported by a head pipe 6 of a vehicle body frame 5 via a steering stem 4. A bar-type handle 7 is mounted on an upper portion of the steering stem 4.

The vehicle body frame 5 includes the head pipe 6, a pair of left and right main tubes 8, a pair of left and right pivot frames 9, a single down frame 11, a pair of left and right lower frames 12, and a seat frame 13.

When seen from the side, the head pipe 6 is inclined and extends to be located further upward as it goes to a rear side. The left and right main tubes 8 extend rearward and downward from a rear upper portion of the head pipe 6 to the rear. Rear end portions of the left and right main tubes 8 are connected to upper end portions of the left and right pivot frames 9 in an intermediate portion of the vehicle body in a forward and rearward direction. The single down frame 11 extends diagonally rearward and downward from a rear lower portion of the head pipe 6 to be steeper than the left and right main tubes 8.

The left and right lower frames 12 branch left and right from a lower end portion of the down frame 11 and extend diagonally rearward and downward. Lower portions of the left and right lower frames 12 are curved rearward. Rear portions of the left and right lower frames 12 are connected to lower end portions of the left and right pivot frames 9. The seat frame 13 is connected to rear portions of the left and right main tubes 8.

The vehicle body frame 5 constitutes a twin spar type cradle frame. An engine 21 which is a prime mover of the motorcycle 1 is mounted on an inner portion of the vehicle body frame 5. The term "intermediate" used in the present embodiment means not only a center between both ends of a target but also an inner range between both ends of the target.

A front end portion (a base end portion) of a swing arm 15 is supported at lower portions of the left and right pivot frames 9 to be swingable up and down. A rear wheel 17 of the motorcycle 1 is pivotally supported at a rear end portion of the swing arm 15. A lower end portion of a rear cushion (not shown) is connected to a front lower portion of the swing arm 15 via a link mechanism 18. An upper end portion of the rear cushion is connected to a cross member (not shown) which extends between a vicinity of the rear end portions of the left and right main tubes 8.

The engine 21 is a single-cylinder engine having a crankshaft parallel to a vehicle width direction (a left and right direction). A lower portion of the engine 21 constitutes a crankcase 22. A cylinder 23 stands substantially vertically on a front upper portion of the crankcase 22.

A throttle body (not shown) of an engine intake system is connected to a rear portion of the cylinder 23. An exhaust pipe (not shown) of an engine exhaust system is connected to a front portion of the cylinder 23. A rear portion of the crankcase 22 also serves as a transmission case for accommodating a clutch and a transmission. An output shaft of the transmission protrudes from a left side of a rear portion of the crankcase 22. The output shaft and the rear wheel 17 are connected via a chain type transmission mechanism 19.

A fuel tank 31 is provided above the cylinder 23 and between the left and right main tubes 8. A seat 24 is provided on the seat frame 13 behind the left and right main tubes 8. The seat 24 extends forward and backward. A front portion of the seat 24 is supported on an upper surface of a rear portion of the fuel tank 31.

In the drawings, reference numeral 25 indicates a front fender supported by a bottom bridge of the steering stem 4. Reference numeral 26 indicates a rear fender extending behind the seat 24. Reference numeral 27 indicates a pair of left and right radiators disposed on both sides of the down frame 11. And reference numeral 28 indicates a pair of left and right shrouds which cover a range from a side surface of the fuel tank 31 to a front of side surfaces of the left and right radiators 27.

<Fuel Shutoff Valve Unit>

The above-described motorcycle 1 includes a fuel shutoff valve unit U. The fuel shutoff valve unit U includes a valve device 50 which discharges a volatile fuel in the fuel tank 31 to the outside and prevents leakage of a liquid fuel.

A mounting structure for the fuel shutoff valve unit U is to fix an accommodation container 100 in which the valve device 50 is accommodated to the fuel tank 31.

As shown in FIGS. 3 to 6, a filler tube F (also referred to as a filler pipe) for supplying a fuel supplied from the outside to the inside is provided inside the fuel tank 31. The filler tube F is formed in a cylindrical shape, for example.

A fuel cap (not shown) is mounted on an upper portion of the filler tube F. The upper portion of the filler tube F is mounted from the back side of an opening 31A provided in an upper surface of the fuel tank 31. That is, the filler tube F is mounted to protrude toward the inside of the fuel tank 31. An inner peripheral surface F2 of the filler tube F communicates with the outside and the inside of the fuel tank 31.

As a result, when the fuel is supplied from the outside, a refueling nozzle is inserted into the opening F1 at the upper portion of the filler tube F, and the fuel is supplied to the inside of the fuel tank 31.

A support member B for fixing the fuel shutoff valve unit U is mounted on a part of an outer peripheral surface F3 of the filler tube F. The support member B is mounted to protrude horizontally from the outer peripheral surface F3 of the filler tube F.

The support member B is formed in a plate shape. Hereinafter, a protruding end portion of the support member B is referred to as a front end portion, an end portion thereof on which the filler tube F is mounted is referred to as a rear end portion, and a pair of side end portions thereof which connect the front end portion to the rear end portion are referred to as both side end portions B1 and B2. Both side end portions B1 and B2 of the support member B are bent downward to form a flange. Thus, flexural rigidity of the support member B when the fuel shutoff valve unit U is mounted is improved.

A rear end portion of the support member B is formed by being cut out in a segmental circular arch shape along a shape of an outer diameter of the outer peripheral surface F3 of the filler tube F. The rear end portion of the support member B is welded to the outer peripheral surface F3 of the filler tube F.

A U-shaped cutout part B5 for mounting the fuel shutoff valve unit U is formed on a front end portion B4 side of the support member B. The cutout part B5 is formed by being cut out according to a shape of a fitting part 115 of the fuel shutoff valve unit U which will be described later.

A locking part B8 for locking a hook part 116 of the fuel shutoff valve unit U is formed on a rear end portion B3 side of the support member B as described later. The locking part B8 is, for example, a rectangular through hole.

A pair of claw parts B6 and B7 are formed on both sides of the cutout part B5 by forming the cutout part B5 in the support member B. The pair of claw parts B6 and B7 are formed to sandwich the fuel shutoff valve unit U. That is, in the support member B, the cutout part B5 is formed in a U shape by an arch-shaped arch end B5A and a pair of sandwiching ends B6A and B7A serving as side end portions of the pair of claw parts B6 and B7. When the fuel shutoff valve unit U is inserted into the cutout part B5, it is fixed to the support member B. Due to the U-shaped cutout part B5, three sides of the cylindrical valve device 50 of the fuel shutoff valve unit U can be supported, and horizontal position restriction can be easily performed.

The fuel shutoff valve unit U is an accommodation container which accommodates the valve device 50 and is fixed to the support member B. Here, the valve device 50 is a device including a float valve 51 (a valve) which is operated to prevent fuel leakage when the vehicle body is inclined at at least a predetermined angle or falls over while a volatile fuel (a vapor) filled inside is prevented from being released into the atmosphere.

The valve device 50 includes the float valve 51, and the float valve 51 moves up and down according to a liquid level of the fuel. The applicant proposes, for example, a valve device for preventing fuel leakage in Japanese Unexamined Patent Application, First Publication No. 2006-46136. Since the valve device 50 of the present embodiment is configured in the same manner as a known rollover valve, detailed description thereof will be omitted here.

The valve device 50 is formed in a columnar shape, for example. The fuel shutoff valve unit U includes the accommodation container 100 which accommodates the valve device 50. The accommodation container 100 includes a cylindrical main body part 101 in which an accommodation space for accommodating the valve device 50 is formed, a lid part 110 which closes an opening formed in an upper portion of the main body part 101, and a disk-shaped bottom plate 120 which closes an opening formed in a lower portion of the main body part 101.

The lid part 110 includes, for example, a disk-shaped top plate 111 and a cylindrical side wall part 112 which hangs downward from a side surface of the top plate 111 and is formed to extend along the side surface. An outer diameter of the side wall part 112 is formed to be smaller than an outer diameter of the main body part 101. Thus, a stepped part D is formed at a connection portion between a top portion of the main body part 101 and a lower end portion of the side wall part 112.

A columnar pipe mounting part 114 which protrudes horizontally toward the outside is formed on the side wall part 112. For example, one end of a breather tube P (refer to FIG. 1) is connected to the pipe mounting part 114. The breather tube P is, for example, a pipe having both flexibility and oil resistance. Due to the breather tube P, a breather passage Y for leading out the volatile fuel in the fuel tank 31 to the outside is secured.

The other end of the breather tube P is connected to, for example, a charcoal canister (not shown; hereinafter, shortened to a canister). The breather tube P guides a mixed gas (the volatile fuel) of volatile gasoline and air in the tank to the canister. That is, the pipe mounting part 114 becomes a part of the breather passage Y in the fuel shutoff valve unit U.

Further, a flange part 113 which is offset upward from the stepped part D and is formed to protrude horizontally outward in a radial direction of the side wall part 112 in a plan view is formed on the side wall part 112. The flange part 113 is formed, for example, in a shape in which a part of a disk is cut off. A pipe mounting part 114 is disposed at a portion in which a part of the disk is cut off.

The flange part 113 is disposed so that a distance between a bottom surface and the stepped part D is slightly larger than a thickness of the support member B. That is, the fitting part 115 is formed between the bottom surface of the flange part 113 and the stepped part D so that the support member B is fitted thereto.

In the flange part 113, the hook part 116 is formed on the side opposite to the pipe mounting part 114 with the top plate 111 sandwiched therebetween in a plan view. The hook part 116 is formed to be locked to the locking part B8 provided on the support member B.

The hook part 116 is formed to protrude horizontally outward in the radial direction of the flange part 113 in a plan view. The hook part 116 is formed, for example, in a shape of a rectangular flat plate. A tapered surface 116A of which a cross section decreases toward a tip end is formed at a tip end portion of the hook part 116 to be directed downward.

A protruding part 116B which protrudes downward continuously to the tapered surface 116A is formed at a rear end of the tapered surface 116A. That is, the protruding part 116B protrudes from a lower surface of the hook part 116 in a triangular columnar shape in a side view. The protruding part 116B is formed to be at a position corresponding to the locking part B8 of the support member B in a state in which the fuel shutoff valve unit U is inserted into the cutout part B5 of the support member B.

With the above-described configuration, the pair of claw parts B6 and B7 are inserted into the fitting part 115 formed between the flange part 113 and the stepped part D to sandwich the side wall part 112 of the lid part 110 when the fuel shutoff valve unit U is inserted into the cutout part B5 of the support member B. Then, movement of the pair of claw parts B6 and B7 in a vertical direction is restricted by the flange part 113 and the stepped part D, and the vertical positioning can be reliably performed.

At this time, the fuel shutoff valve unit U is inserted into the cutout part B5 in a direction in which an insertion direction and an axial direction of the hook part 116 coincide with each other. At the time of insertion, while the pair of sandwiching ends B6A and B7A of the pair of claw parts B6 and B7 and the side wall part 112 slide, the pair of claw parts B6 and B7 are guided between the flange part 113 and the stepped part D, and the protruding part 116B of the hook part 116 comes into contact with the arch end B5A of the support member B.

Then, when the fuel shutoff valve unit U is further pushed in a direction in which it becomes proximal to the filler tube F, the tapered surface 116A of the hook part 116 comes into contact with an upper corner portion of the arch end B5A. Further, when the fuel shutoff valve unit U is pushed in the direction in which it becomes proximal to the filler tube F, the tapered surface 116A slides on the upper corner portion of the arch end B5A, the hook part 116 is elastically deformed to warp upward, and the protruding part 116B is placed on the upper surface of the support member B.

Further, when the fuel shutoff valve unit U is further pushed in the direction in which it becomes proximal to the filler tube F, the wall surface part 112 of the fitting part 115 comes into contact with the arch end B5A, the elastic deformation of the hook part 116 is released, and the protruding part 116B is caught by the locking part B8.

In this state, since the movement of the pair of claw parts B6 and B7 in the vertical direction is restricted by the flange part 113 and the stepped part D, the hook part 116 does not come off from the locking part B8, and the fuel shutoff valve unit U is fixed to the support member B. That is, due to the hook part 116 and the locking part B8, the movement of the fuel shutoff valve unit U in a rotation direction around an axis L in the vertical direction and in a direction away from the filler tube F is restricted. Thus, the movement of the fuel shutoff valve unit U in the horizontal direction is restricted, and the horizontal positioning can be reliably performed.

That is, at the time of mounting the fuel shutoff valve unit U, when an operator inserts the fuel shutoff valve unit U into the cutout part B5 to lock the hook part 116 to the locking part B8 and sandwiches the side wall part 112 via the pair of claw parts B6 and B7, the fuel shutoff valve unit U can be fixed to a vicinity of the filler tube F.

The fuel shutoff valve unit U is mounted in the support member B, for example, in a state in which the fuel tank 31 is divided in the vertical direction. After that, upper and lower portions of the fuel tank 31 are welded. Similarly, in a state in which an opening in which the fuel shutoff valve unit U can be mounted is provided in a part of the upper surface or the lower surface of the fuel tank 31, the fuel shutoff valve unit U may be mounted in the fuel tank 31, and then the opening may be closed by welding, screwing, or the like.

Further, the fuel shutoff valve unit U may be mounted in the fuel tank 31 in a state in which it is mounted in the filler tube F. That is, the fuel shutoff valve unit U mounted in the filler tube F is inserted into the fuel tank 31, for example, through an opening 31A (refer to FIG. 3) formed in the fuel tank 31 together with the filler tube F.

Then, the fuel shutoff valve unit U is installed inside the fuel tank 31 by fixing the filler tube F to the inside of the upper surface of the fuel tank 31. An upper portion of the filler tube F is welded to the inside of the upper surface of the fuel tank 31, for example. In addition, the fuel shutoff valve unit U may be inserted through an opening (not shown) for mounting a fuel pump provided in the fuel tank 31 and may be mounted on the support member B provided at the filler tube F.

One end of the breather tube P is connected to the pipe mounting part 114 of the fuel shutoff valve unit U, and the other end thereof is drawn out of the fuel tank 31 through, for example, a through hole (not shown) provided in the bottom plate of the fuel tank 31. A gap between the through hole and the breather tube P is filled with a sealing material or the like to maintain airtightness.

In addition to the method of passing through the through hole, the breather tube P may secure the breather passage by connecting the other end thereof to a connection pipe (not shown) welded through the bottom plate of the fuel tank 31 and connecting another breather tube P to a connection pipe protruding to the outside of the bottom plate of the fuel tank 31. The through hole and the connection pipe for securing the breather passage Y may be provided not only at the bottom plate of the fuel tank 31 but also at other positions.

For example, the breather tube P is connected to the fuel shutoff valve unit U in a state in which the fuel tank 31 is divided into upper and lower portions, and piping to the outside of the fuel tank 31 is performed. After that, the upper and lower portions of the fuel tank 31 are welded. Further, the breather tube P may be connected by inserting a hand or a tool from a fuel filler port in a state in which the fuel shutoff valve unit U is mounted in the fuel tank 31.

Next, the arrangement of the fuel shutoff valve unit U inside the fuel tank 31 will be described. In the fuel tank 31, the filler tube F is disposed at substantially a center of the vehicle body in a plan view. The support member B is disposed at substantially the center of the vehicle body by being mounted to the filler tube F. Along with this, the fuel shutoff valve unit U is disposed at substantially the center of the vehicle body. Since the fuel shutoff valve unit U is disposed at the center in the vehicle width direction in a plan view and within a width of the main frame, it can be compactly disposed in the width direction thereof. Further, since the fuel shutoff valve unit U is disposed inside a region X which connects the handle 7 to a step 40 (refer to FIG. 2), it is configured to not interfere with a riding posture of a rider.

Figure 7:
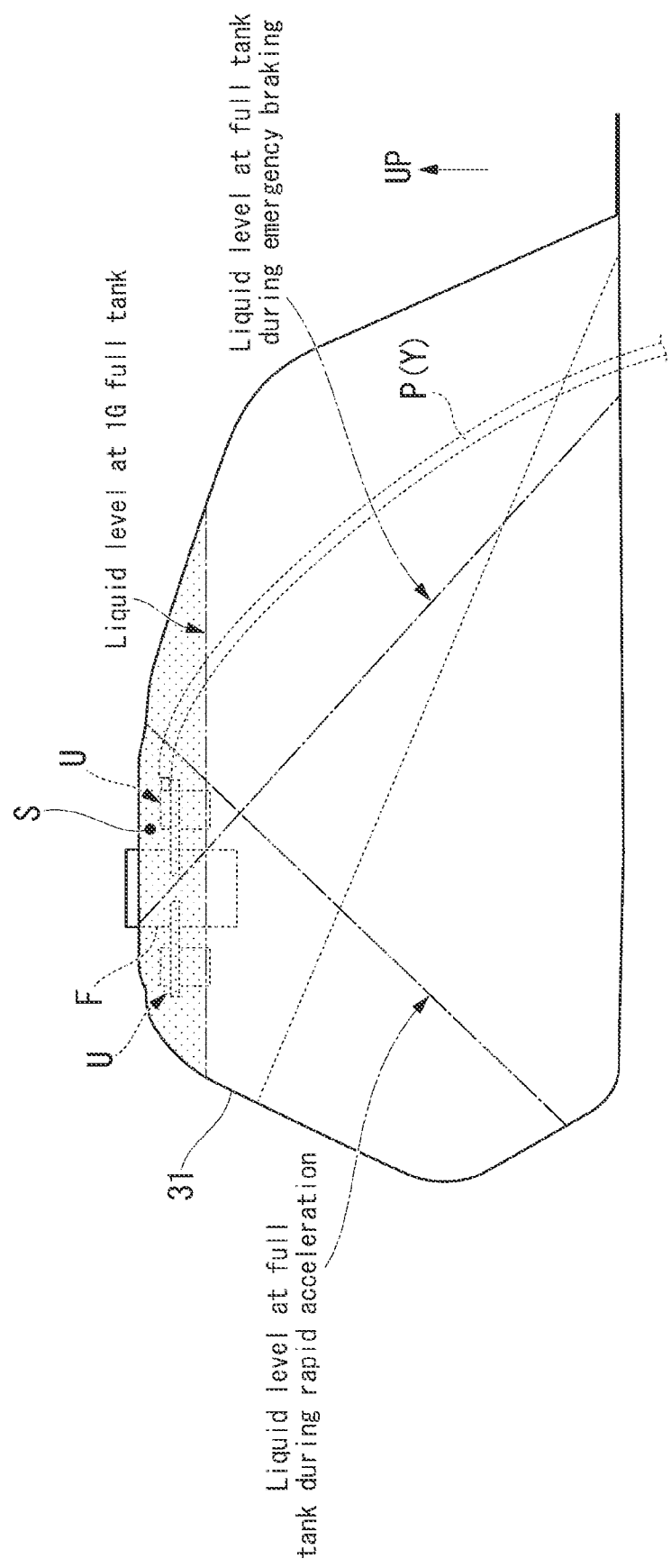
FIG. 7 is a diagram showing an arrangement of the fuel shutoff valve unit in a fuel tank.

As shown in FIG. 7, the fuel shutoff valve unit U is disposed in a space above a liquid level at which the fuel in a stopped state of the vehicle is full (a 1G full liquid level). An angle of the fuel level changes during sudden acceleration or braking. Since the valve device 50 may be temporarily immersed in the fuel as described above, the fuel shutoff valve unit U may be disposed in the space above the 1G full liquid level.

The fuel shutoff valve unit U may be disposed in any of the forward and rearward directions with respect to the filler tube F when the fuel tank 31 is seen from the side, and may be disposed in a space above the 1G full liquid level.

As shown in FIG. 8, the fuel shutoff valve unit U may be disposed in any of the left and right directions with respect to the filler tube F when the fuel tank 31 is seen from the front, and may be disposed in the space above the 1G full liquid level. With such a configuration, the fuel shutoff valve unit U can effectively collect the volatile fuel filled inside the fuel tank 31 via by the valve device 50 and can lead it out to the outside of the fuel tank 31 through the breather passage Y.

According to the mounting structure for the fuel shutoff valve unit U as described above, the structure can be simplified and the mounting process can be performed easily and reliably. According to the fuel shutoff valve unit U, since the fuel shutoff valve unit U is mounted on the support member B provided inside the fuel tank 31, and the fuel shutoff valve unit U is not visible from the outside, aesthetic appearance of the vehicle is improved.

Although the modes for implementing the present invention have been described above using the embodiment, the present invention is not limited to the embodiment, and various modifications and substitutions can be added without departing from the gist of the present invention. For example, in the above-described embodiment, the application to a motorcycle for off-road driving has been described as an example, but the use of the vehicle is not limited at all.

Since the fuel tank 31 is formed to have a shape which is gently inclined upward from the head pipe, reaches the top portion, and then descends rearward, emission efficiency of the volatile fuel is improved by disposing the fuel shutoff valve unit U around the top portion.

In addition, the saddle type vehicle includes all vehicles in which a driver rides across the vehicle body, and also includes not only motorcycles (including motorized bicycles and scooter type vehicles), but also three-wheeled vehicles (including front two-wheeled and rear one-wheeled vehicles in addition to front one-wheeled and rear two-wheeled vehicles) or four-wheeled vehicles.

Further, in the above-described embodiment, although the hook part 116 which protrudes from the flange part 113 is formed to be locked to the locking part B8 of the support member B, the present invention is not limited thereto, and the protruding part may be provided on the support member B side, and an opening or a recess may be provided on the flange part 113 side. Further, although the fuel shutoff valve unit U is configured to be fixed to the support member B by the hook part 116 and the locking part B8, the present invention is not limited thereto, and the cutout part B5 may be formed so that the tip ends of the pair of claw parts B6 and B7 hold the side wall part 112, and the fuel shutoff valve unit U may be fixed by the pair of claw parts B6 and B7. In that case, the rotation of the fuel shutoff valve unit U may be restricted by providing a rotation prevention shape so that a cross-sectional shape of the side wall part 112 is formed to have a D shape and the cutout part B5 is also formed accordingly.

In the fuel shutoff valve unit U, the pipe mounting part 114 is disposed above the fuel tank 31 and above the lower end of the filler tube F. Accordingly, since the upper portion of the fuel shutoff valve unit U can be disposed above the 1G full liquid level in the fuel tank 31, the volatile fuel can be efficiently collected.

REFERENCE SIGNS LIST

50 Valve device
100 Accommodation container
110 Lid part
113 Flange part
115 Fitting part
116 Hook part
B Support member
B6, B7 Claw part
B8 Locking part
F Filler tube
P Breather tube
U Fuel shutoff valve unit

The invention claimed is:

1. A mounting structure for a fuel shutoff valve unit including a valve device which is provided in a fuel tank of a saddle type vehicle and in which a breather passage which discharges volatile fuel to the outside is formed and a float valve which prevents leakage of liquid fuel is provided,
   wherein, in the saddle type vehicle including a filler tube which is provided inside the fuel tank and supplies fuel supplied from the outside to the inside of the fuel tank,
   a support member which is integrally provided on an outer peripheral surface of the filler tube and supports the fuel shutoff valve unit inside the fuel tank is provided,
   the support member includes a pair of claw parts formed to sandwich and fix the fuel shutoff valve unit,
   the fuel shutoff valve unit includes a fitting part which is fitted to the pair of claw parts and fixes the fuel shutoff valve unit to the support member, and
   both side end portions of the support member are bent downward to form a flange.

2. The mounting structure according to claim 1, wherein the fuel shutoff valve unit includes a flange part formed to protrude outward in a radial direction of the fuel shutoff valve unit in a plan view, and
   the pair of claw parts support a lower surface of the flange part.

3. The mounting structure according to claim 2, wherein a hook part formed to protrude outward in the radial direction in a plan view is provided on a part of a side surface of the flange part, and
   the support member includes a locking part formed so that the hook part is locked thereto in a state in which the fuel shutoff valve unit is fitted.

4. The mounting structure according to claim 1, wherein the filler tube is disposed to protrude inward from an upper surface of the fuel tank.

5. The mounting structure according to claim 1, wherein, in the fuel tank, the filler tube is disposed at substantially a center of the vehicle in a plan view, and
   the support member is disposed at substantially the center of the vehicle by being mounted on the filler tube.

6. The mounting structure according to claim 1, wherein the fuel shutoff valve unit is mounted above a liquid level of the fuel in the fuel tank when the vehicle is stopped.

* * * * *